(12) United States Patent
Bus et al.

(10) Patent No.: US 12,457,213 B2
(45) Date of Patent: Oct. 28, 2025

(54) SECURE REUSE OF CLOUD AT CUSTOMER HARDWARE

(71) Applicant: Oracle International Corporation, Redwood Shores, CA (US)

(72) Inventors: Jennifer Bus, Mountlake Terrace, WA (US); Jaime Ismael Rangel Martinez, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 206 days.

(21) Appl. No.: 17/988,559

(22) Filed: Nov. 16, 2022

(65) Prior Publication Data

US 2024/0163287 A1 May 16, 2024

(51) Int. Cl.
*H04L 9/40* (2022.01)

(52) U.S. Cl.
CPC .............. *H04L 63/10* (2013.01); *H04L 63/06* (2013.01)

(58) Field of Classification Search
CPC ........ H04L 63/10; H04L 63/06; H04L 63/126
See application file for complete search history.

(56) References Cited

U.S. PATENT DOCUMENTS

| | | | |
|---|---|---|---|
| 9,948,902 B1 * | 4/2018 | Trundle | G06V 20/52 |
| 10,972,449 B1 * | 4/2021 | Levin | G06F 21/445 |
| 2005/0015455 A1 * | 1/2005 | Liu | H04L 51/212 |
| | | | 709/204 |
| 2008/0129501 A1 * | 6/2008 | Tucker | G08B 13/06 |
| | | | 340/550 |
| 2012/0268550 A1 * | 10/2012 | Park | H04N 7/188 |
| | | | 348/14.02 |
| 2016/0269427 A1 * | 9/2016 | Haugsnes | G06F 21/552 |
| 2017/0176034 A1 * | 6/2017 | Hussain | G05B 19/048 |
| 2019/0379729 A1 * | 12/2019 | Patel | G06F 11/301 |
| 2020/0250945 A1 * | 8/2020 | Liiv | G08B 13/19671 |
| 2020/0379529 A1 * | 12/2020 | Le Goff | G06F 1/206 |
| 2021/0165898 A1 * | 6/2021 | Weiss | G06F 16/13 |
| 2022/0404804 A1 * | 12/2022 | Amaro, Jr. | G06F 9/45558 |
| 2023/0086344 A1 * | 3/2023 | Dawes | H04L 12/2834 |
| | | | 715/765 |
| 2023/0129306 A1 * | 4/2023 | Savage | H04L 9/3226 |
| | | | 713/156 |
| 2023/0229118 A1 * | 7/2023 | Pizzato | G05B 9/02 |
| | | | 307/326 |
| 2024/0036849 A1 * | 2/2024 | Frey | G06F 8/65 |

* cited by examiner

*Primary Examiner* — Richard G Keehn
(74) *Attorney, Agent, or Firm* — Kilpatrick Townsend & Stockton LLP

(57) ABSTRACT

Techniques in this disclosure include polling statuses of one or more assets with one or more messages signed by a device private key. The statuses can be polled by a computing device. The techniques can include receiving one or more replies from the one or more assets. A reply can be signed with an asset private key and the reply can contain an asset status. The computing device can validate the one or more replies using one or more asset public keys. The computing device can add the statuses from the validated replies to a status log.

17 Claims, 11 Drawing Sheets

600

Poll the Statuses of the Asset(s) with One or More Messages Signed with a Private Key 610

Receive One or More Replies from the Asset(s) 620

Validating the One or More Replies Using One or More Asset Public Keys 630

Adding One or More Statuses from the Validated Replies to a Status Log 640

*FIG. 6*

SECURE REUSE OF CLOUD AT CUSTOMER HARDWARE

BACKGROUND

Customers of a cloud services provider may wish to have datacenter assets located at the customer's facility. However, datacenter assets can be vulnerable to physical tampering that can compromise the cloud services provider's network. The cloud services provider may struggle to ensure asset integrity at a customer facility outside of the provider's direct control. Accordingly, improvements to datacenter asset monitoring are desirable.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method may include polling the statuses of one or more assets. The assets can be polled with messages that are signed using a device private key. Replies from the assets may be received at a computing device in response to the messages. The replies can be signed with a server private key and the reply can contain the asset's status. The method may also include validating the replies using server public keys. The method may include adding statuses from the validated replies to a status log. Other embodiments of this aspect include corresponding computer systems, apparatus, and computer programs recorded on one or more computer storage devices, each configured to perform the actions of the methods.

Implementations may include one or more of the following features. A method where the computing device and the one or more servers communicate using a private network. A method where a message contains a first nonce and a reply to the message contains a second nonce. A method where the nonce may include at least one of a random number, a pseudo-random number, or a timestamp. A method where the one or more assets may include a physical security controller. A method where adding the one or more statuses may include: signing the one or more statuses using the device private key. A method where the status is added to the status log if the reply is received within a threshold amount of time of the polling. Implementations of the described techniques may include hardware, a method or process, or a computer tangible medium.

In one general aspect, a non-transitory computer-readable medium may store computer-executable instructions, where executing the computer-executable program instructions configures a processing device to perform operations that may include polling the statuses of one or more assets with messages that are signed using a device private key. The operations may include receiving replies from the assets in response to the messages. The replies can be signed with a server private key and the reply can contain the asset's status. The operations may also include validating the replies using server public keys. The operations may include adding statuses from the validated replies to a status log. Other embodiments of this aspect include corresponding computer systems, apparatus, and computer programs recorded on one or more computer storage devices, each configured to perform the actions of the methods.

In one general aspect, a computing device may include a storage device and one or more processors configured to execute program instructions stored in the storage device that cause the processor to: poll statuses of one or more assets with one or more messages signed by a device private key; receive one or more replies signed by a server private key and containing the server's status from the one or more server; validate the one or more replies using one or more server public keys; and add one or more statuses from the validated replies to a status log. Other embodiments of this aspect include corresponding computer systems, apparatus, and computer programs recorded on one or more computer storage devices, each configured to perform the actions of the methods.

BRIEF DESCRIPTION OF THE DRAWINGS

FIG. 6 is a diagram showing a method for monitoring the status of a datacenter asset according to an embodiment.

DETAILED DESCRIPTION

Figure 1:
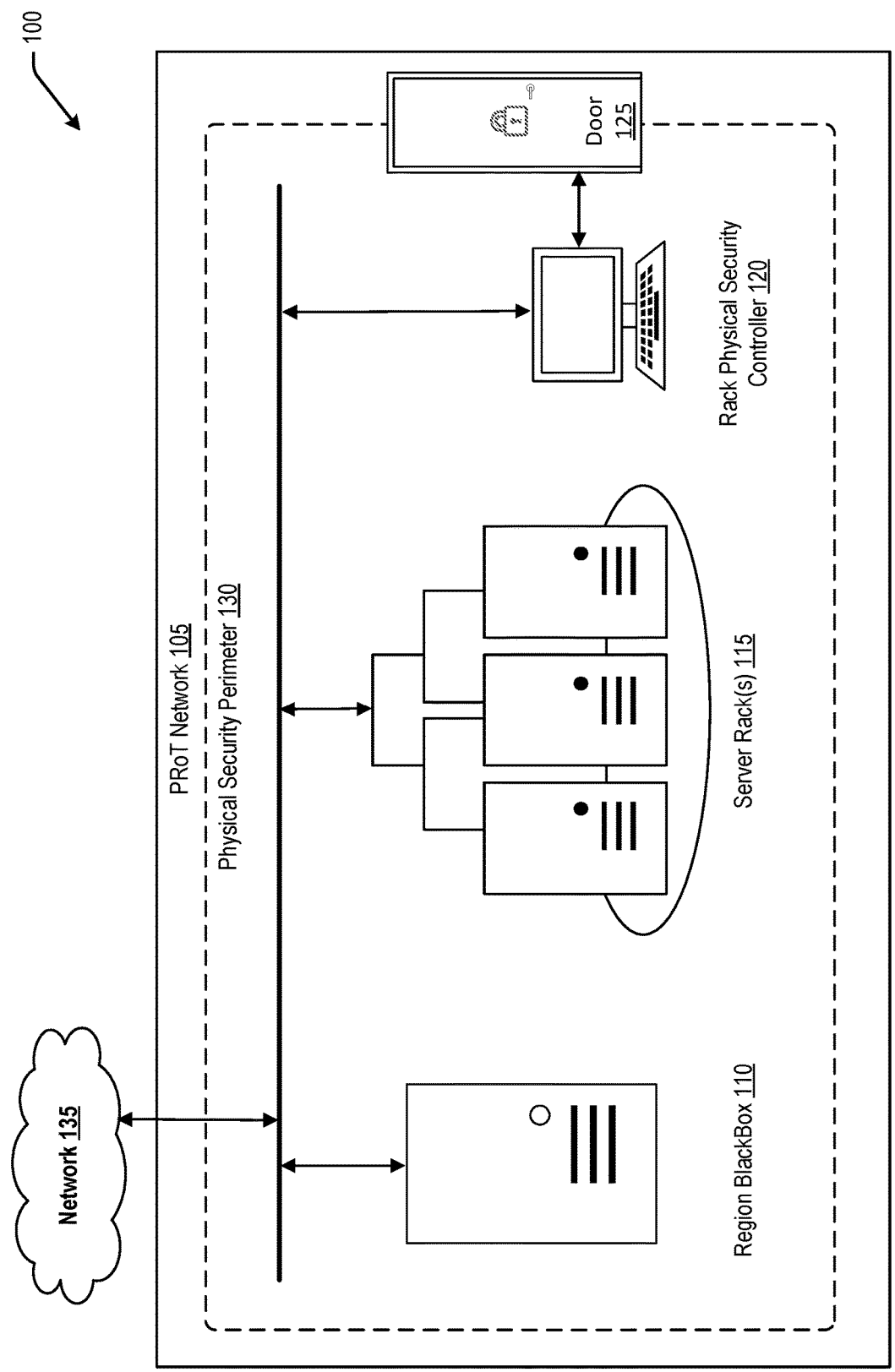
FIG. 1 shows a simplified diagram of a platform root of trust (PRoT) network according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques for tracking assets in a datacenter are disclosed herein. Customers may request that datacenter assets are in a physical location of a customer's choosing rather than on a cloud services provider's premises. Assets can include servers, network switches, cooling systems, a security controller or any other asset used in a datacenter. The location can be selected to satisfy security, residency, regulatory, or data residency requirements. For instance, a customer managing high security data, such as a government agency, may be required to store the data within a government facility.

Locating the datacenter assets in a customer's facility, and out of the cloud services provider's direct control, can expose the cloud service provider's network to threats. The datacenter assets may be connected to the provider's cloud network and the assets can be used to gain access to the network. A cloud services provider can control access to the provider's own premises, however locating datacenter assets in a customer's facility can make it more difficult for a provider to control access to the assets. In addition, the cloud services provider may not be able to prevent the customer from tampering with the assets to access data on the provider's network.

Assets located outside of a cloud services provider's premises can face several threats. For instance, the assets can be exposed to physical attacks where components are stolen or replaced with lower quality or counterfeit components. Physical attacks can include adding malicious active components to the datacenter assets. These components can be used to perform unauthorized data transfers from a computer (e.g., data exfiltration).

Potential attackers can vary in their level of skill and their motivations. A customer's employee may replace asset components to resell the stolen merchandise. Other attackers, such as skilled hackers may attack datacenter assets as part of sophisticated criminal activity such as ransomware attacks. Alternatively, nation state actors may attempt to add malicious active components to datacenter assets to collect information from the cloud services provider's networks.

Physical security techniques can be used to mitigate threats to the datacenter assets. These techniques can include a secure chain of custody for datacenter assets to prevent their replacement or alteration before the assets enter production. An asset can enter production by being used for the asset's intended purpose (e.g., powered on and connected to other assets). In addition, the assets can be tamper-proofed to make it harder to alter an asset and to increase the likelihood that any tampering is discovered. Physical security can be provided, in part, using a rack physical security controller that can control doors, closed circuit cameras, and other physical security devices.

Hardware and firmware security techniques can protect datacenter assets during production. Hardware and firmware security techniques can use cryptographic methods to provide a record of the device's integrity state during production. The integrity state, which can be recorded at regular intervals or on demand, can be a record of the device's state, configuration, and firmware version.

The integrity state for a region's assets can be recorded by a device called region blackbox that uses cryptographic signatures to create a status log that can be difficult or impossible to falsify. The integrity state for an asset can be recorded by a device called a platform root of trust (PRoT). The blackbox can receive the integrity state from the PRoT(s) using encrypted messages, and a signed timestamp for each message can attest that the messages were created during production. The ability to track time and have all devices synced up can become part of a TCB (Trusted Computing Base). The PROT can communicate with the blackbox via a PRoT network using a dedicated network port, and the network's cryptography can reduce the risk of man in the middle (MITM) attacks where messages are intercepted.

The PRoT can broadcast the integrity status at regular intervals to create a "heartbeat" for datacenter assets connected to the PRoT network. The blackbox can flag interruptions to this "heartbeat," the cadence of integrity status messages, as potential security threats. The interruption can be caused by an asset being disconnected from power, or from the PRoT network, both of which can indicate tampering with the asset. However, the blackbox can create tickets for maintenance or security events that can allow assets to be disconnected under some circumstances. In some embodiments, the tickets can be created by other factors/operation teams, but the blackbox can determine when the assets are being created and for what assets those tickets are being created to prevent false positives. The blackbox can transmit a region report to the cloud services provider summarizing the integrity status for assets in a datacenter region. A datacenter may be air gapped, or isolated from outside networks, for security reasons, and, in these circumstances, the blackbox can be a proxy for the cloud services provider.

In an illustrative example, a region blackbox, located in a bank facility, provides a maintenance ticket scheduling a part replacement for a server rack. The blackbox receives regular signals from assets in the facility including signals from PRoTs within the individual servers in the server rack. A technician at the bank facility attempts to perform the maintenance but removes the wrong server. An accelerometer on the wrong server detects movement caused by the technician and sends a signal to the server's PRoT. The PRoT forwards a message showing that the server's status has changed from "running" to "tainted" to the blackbox. The technician, realizing his error, returns the wrong server to the rack and removes the correct server and performs the scheduled maintenance. The blackbox can create an automated ticket for this event and the ticket can track what happened and why (e.g., that the server may have been removed but the chassis was not opened).

FIG. 1 shows a simplified diagram 100 of a platform root of trust (PRoT) network according to an embodiment. The PRoT network 105 can comprise a wired or wireless network connecting a region blackbox 110 to one or more assets within a datacenter region. For instance, the assets can include the servers in server rack(s) 115, and a rack physical security controller 120. The server rack(s) 115 can be 19-inch racks containing computer servers, networking hardware, telecommunications hardware, cooling systems, and the like.

The rack physical security controller 120 can be a computing device that controls and receives information from one or more physical security devices. For instance, the rack physical security controller 120 can monitor a door 125 to the datacenter region. The physical security controller 120 can operate the physical security devices, and, for instance, the controller can lock or unlock the door 125. The physical security device's status can be recorded by the physical security controller 120. As an example, the status for door 125 can include locked, unlocked, open, closed, jammed, etc. The physical security devices can include locks, doors, security cameras, motion sensors, light sensors, noise sensors, vibration sensors, and the like.

The physical security devices can be used to enforce a physical security perimeter 130 that controls access to the datacenter region. The physical security perimeter 130 can be monitored by the physical security devices to reduce the risk that the region can be accessed without detection. For example, the physical security perimeter 130 can be a datacenter cage, room(s) within a customer's premises, or building(s) on a customer's premises. The physical security perimeter 130 can include one or more perimeters, and the physical security controller 120 can monitor access to a room and one or more datacenter cage(s) within the room. In some embodiments, the physical security perimeter 130 can be a subset of racks in a data center room (e.g., a customer might decide to house racks from different cloud providers/purpose in a single cage.)

The assets within the PRoT network 105 can send periodic, or event based, messages to the region blackbox 110. For instance, a "heartbeat" message containing the integrity status for one or more assets can be sent from a PRoT in server rack(s) 115 every 30 seconds or messages can be sent when the PRoT detects a change in the state of a server in server rack(s) 115 (e.g., movement is detected by a PRoT accelerometer). Region blackbox 110 may send periodic messages to the cloud services provider via network 135. The messages can contain a log of statuses for assets in the PRoT network 105. The cloud services provider can be an entity managing PRoT network 105.

The PRoT network 105 may not be connected to network 135, or any other network, in some circumstances. If the PRoT network 105 is air gapped, or isolated from other networks, the region blackbox 110 may not transmit messages to the cloud services provider. The region blackbox 110 can store an asset status log for assets in the PRoT network 105. An individual, such as a cloud services provider employee, can access the log from the region blackbox 110 via a display device on, or connected to, the blackbox. The individual may obtain a copy of the log via a memory device connected to the region blackbox (e.g., a portable hard drive, thumb drive, etc.).

The asset integrity status log can be a list of statuses compiled from messages received at the blackbox 110 from one or more PRoT(s) within the PRoT network 105. Without authentication, the asset log may be vulnerable to man in the middle style attack where messages between a PRoT and the region blackbox 110 are intercepted or altered. Messages between a PRoT in an asset and the region blackbox 110 can be signed with a private key to mitigate the risk of such attacks. A man in the middle attack can be detected because an attacker may not be able to properly replicate the message signature. In addition, the messages can include signed or encrypted timestamps that could indicate when a message has been intercepted and delayed. The messages may include nonces that may prevent reply or man in the middle attacks. Nonces can prevent these types of attacks because the nonce is difficult or impossible to falsify. A PRoT and a region blackbox 110 can exchange signed or encrypted messages to authenticate the devices prior to the PRoT sending status(es) to the blackbox.

Figure 2:
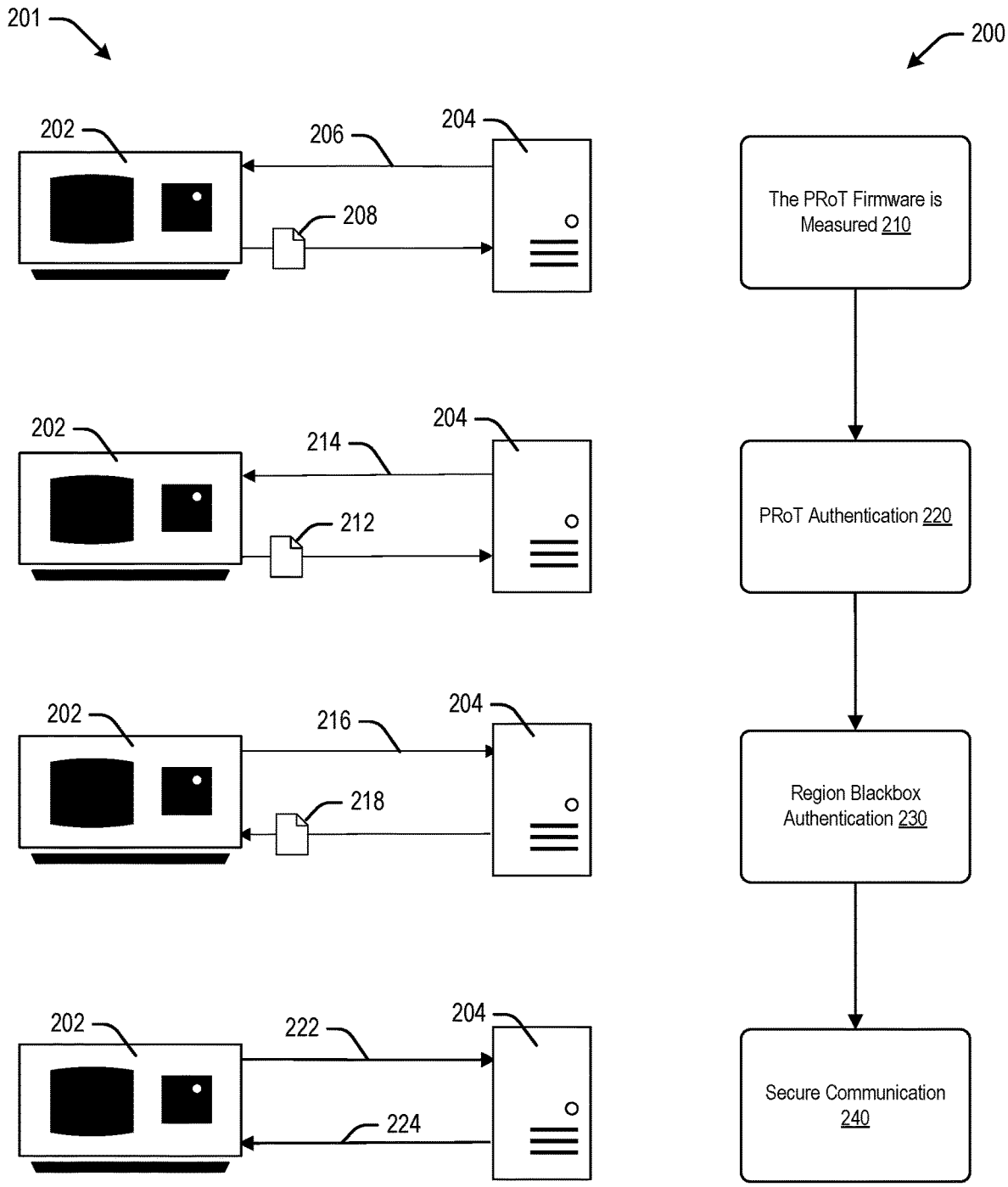
FIG. 2 shows a diagram and a method for authenticating a PRoT according to an embodiment.

FIG. 2 shows a diagram 201 and a method 200 for authenticating a PRoT according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 200 in greater detail, at block 210, the PRoT firmware is measured. The PRoT 202 firmware can be measured to verify the firmware in order to support a secure boot of the PRoT. During a secure boot, the PRoT 202 can verify the firmware's integrity using a firmware measurement. The PRoT 202 can be connected to assets in a datacenter, and, as an example, the PRoT 202 can be in a server rack such as server rack(s) 115. For instance, the region blackbox 204 can send a request 206 for a firmware measurement to the PRoT 202. The firmware measurement 208 can be sent from the PRoT 202 to the region blackbox 204 in response to the request 206. The firmware measurement 208 and request 206 can be sent via a network such as the PRoT network discussed above. The region blackbox can store a status log that can contain the firmware version for the PRoT 202. The firmware measurement 208 can be compared the firmware version or firmware vendor listed in the status log. A discrepancy between the firmware measurement 208 and the firmware listed in the status log can indicate that the firmware has been corrupted or altered.

At block 220, the PRoT can be authenticated. PRoT 202 can prove the device's authenticity by sending an authentication message 212 in response to a request 214 from the region blackbox 204. The authentication message 212 can be signed or encrypted with a private key for PRoT 202. The blackbox 204 can confirm the validity of the authentication message 212 using the public key for the PRoT 202. For example, the region blackbox can use the public key to decrypt an encrypted message or check a signature. The public key for the PRoT 202 can be provided to the region blackbox 204 when the blackbox 204 was manufactured or when the datacenter region is provisioned (e.g., when the blackbox is connected to assets in the datacenter). The authentication message 212 may include a digital certificate such as an X.509 certificate.

At block 230, the region blackbox can be authenticated. The PRoT 202 may send a request 216 to the blackbox 204 requesting that the blackbox 204 prove its authenticity. The region blackbox 204 can send a response to the PRoT 202 containing proof that the blackbox is authentic. For instance, the response 218 may be signed or encrypted with a private key for the blackbox 204. A software measurement for the blackbox 204 can be included in the response 218 and the PRoT 202 may use the measurement to authenticate the blackbox 204. For example, the software version or vendor for the blackbox 204 may be provided to the PRoT 202 during provisioning (e.g., when the PRoT is connected to the region blackbox). The response 218 may include a digital certificate such as an X.509 certificate. The blackbox 204 can produce a signed identity manifest that can include serial numbers, firmware measurements, software versions, region assignment, etc. The identity manifest may be signed by a private key of the blackbox and the PRoT 202 can verify the signed identity manifest using a blackbox public key that can be provided to the PRoT 202 during provisioning. The PRoT 202 may use the signed identity manifest to authenticate the blackbox 204.

At block 240, the region blackbox and PRoT can communicate securely. PRoT messages 222 sent from the PRoT 202 to the blackbox 204 can be encrypted or signed with a private key for the PRoT 202. The blackbox 204 can decrypt the PRoT messages 222 using the public key for the PRoT 202. The blackbox can send blackbox messages 224 from the blackbox 204 to the PRoT 202. The blackbox messages 224 can be encrypted or signed with the private key for the blackbox 204 and the PRoT can decrypt the messages using a blackbox public key.

Figure 3:
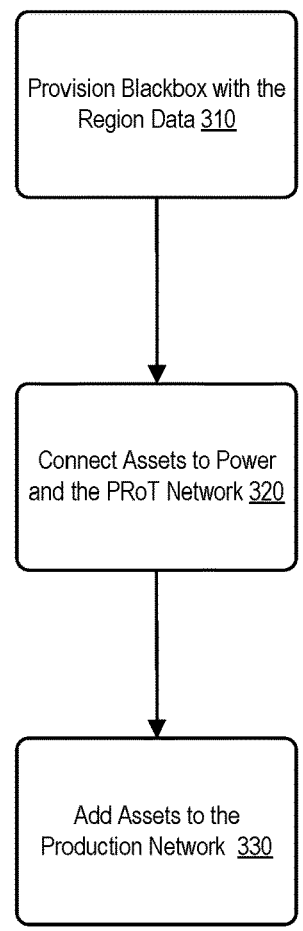
FIG. 3 shows a method for provisioning a PRoT network according to an embodiment.

FIG. 3 shows a method 300 for provisioning a PRoT network according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 300 in greater detail, at block 310, the blackbox can be provisioned with region data. The blackbox can be provisioned during manufacturing and the region data can include public keys for one or more PRoTs that will be connected to the PRoT network. The blackbox may generate region data when the blackbox enters production at the customer's premises. A hardware security module (HSM) in the region blackbox can generate region data such as public and private keys for the PRoTs. The blackbox can distribute the keys to the individual PRoTs connected to the PRoT network.

At block 320, assets can be connected to power and the PRoT network. The assets can include servers, storage, networking equipment, power distribution units (PDUs), switches, patch panels, and the like.

At block 330, assets can be added to the production network. Assets in the datacenter region can communicate using a production network that may be connected to one or more networks such as the Internet. The production network may be isolated, or air gapped, from other networks in some circumstances. The PRoTs and blackbox can communicate using a PRoT network that is separate and physically isolated from the production network. An asset can be connected to a PRoT and the asset can communicate with other assets via the production network while the PRoT can communicate with the region blackbox via the PRoT network. The assets may be able to communicate with the region blackbox via the production network.

An asset can send a signed report, called a platform fingerprint, to the blackbox to prove the asset's identity. The signed report is generated by the PRoT and sent to the blackbox via the PRoT network. The report can be signed using the PRoT's private key that was provided by the blackbox. Assets may be prevented from accessing the production network unless a signed report for the asset is provided to the region blackbox. The signed report can be sent by the PRoT to the blackbox via the PRoT network. An asset that is serviced, replaced, or otherwise disconnected from the production network may have to provide a signed report before the asset is allowed to rejoin the production network.

Assets can be removed or added to the production network while the network is operating (e.g., during production). An asset that is scheduled to be removed can be wiped by a PRoT connected to the asset. The PRoT can generate an attestation documenting that the asset has been wiped and the attestation can be provided to the blackbox. Assets may be prevented from leaving the physical security perimeter unless an attestation has been provided to the blackbox. Assets may be wiped by the PRoT in response to a maintenance ticket provided to the PRoT by the blackbox.

Figure 4:
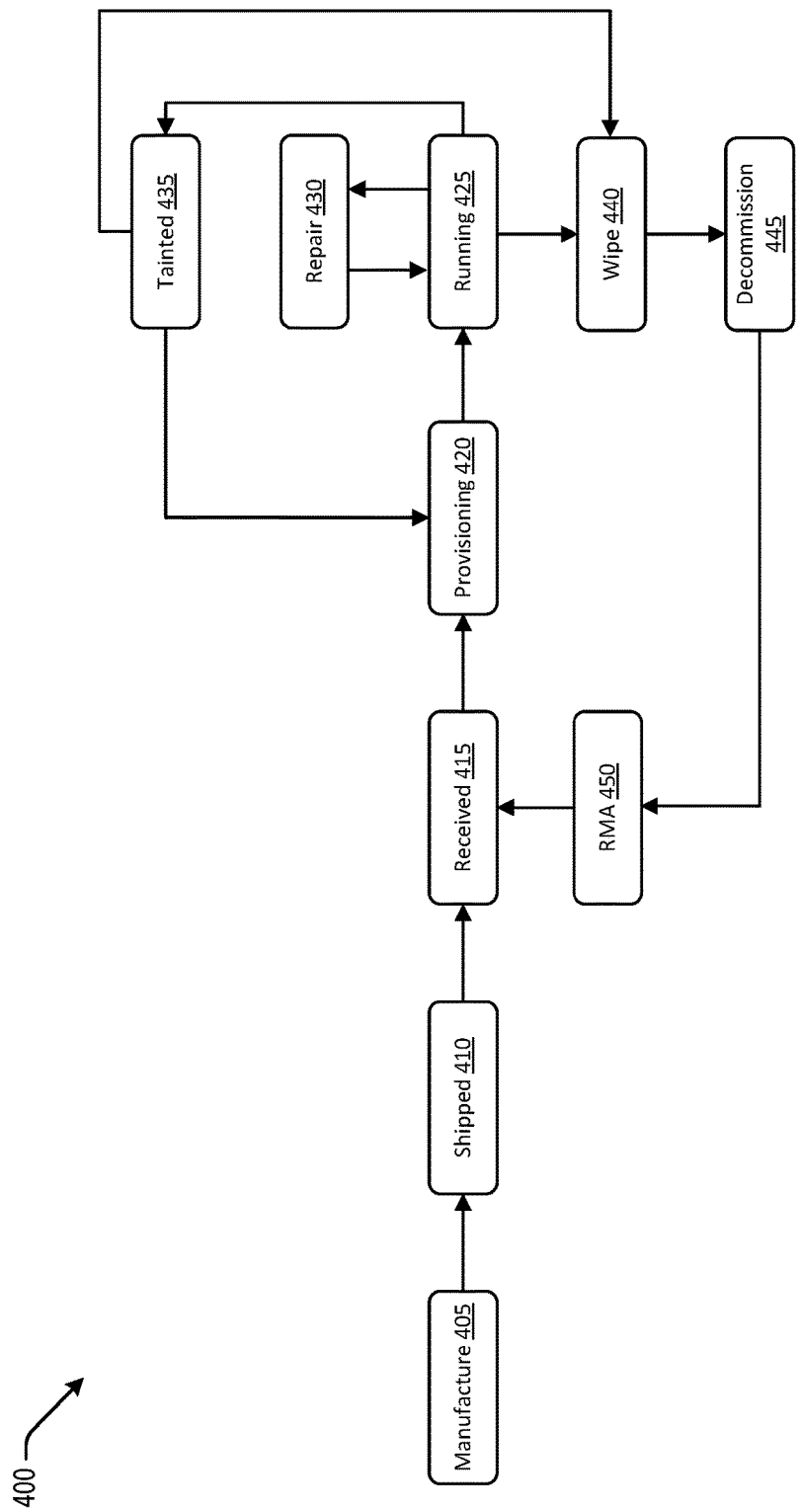
FIG. 4 shows a state diagram of an asset lifecycle according to an embodiment.

FIG. 4 shows a state diagram 400 of an asset lifecycle according to an embodiment. Assets can be tracked throughout their lifecycle so that there is a complete history for the asset. Documentation of an asset's lifecycle can mitigate the risk that an asset can be replaced or altered because records attest to the asset's location throughout the asset's lifecycle. Successfully replacing an asset could mean altering or faking records across multiple databases. Additionally, cryptographic techniques, such as signatures and hashed timestamps, can make it difficult or impossible to successfully fake or alter records for an asset.

The asset lifecycle can begin when the asset is manufactured 405. The asset can be assembled from components or raw material at a point of manufacture (POM) and shipped to a datacenter. The asset may be shipped 410 directly from the POM to the datacenter, or the asset may be shipped to a warehouse or other intermediate facility where the asset can be stored. An asset can be received 415 when it is no longer in transit and the asset has reached a facility such as the datacenter, warehouse, or intermediate facility.

An asset can be provisioned 420 once the asset has been received 415 at the datacenter. Provisioning an asset can mean connecting the asset to power and one or more networks. Assets can be provisioned according to the method disclosed in FIG. 3. An asset that has been provisioned and is operating normally can be running 425. If the asset is operating abnormally, the asset can be repaired 430. The entity managing the datacenter can provide permission to perform maintenance on the asset. For instance, a cloud services provider can provide maintenance ticket to the blackbox. The ticket, granting permission for maintenance, can be transmitted from the blackbox to the PRoT. An enclosure around the asset can be opened, and the asset can be disconnected from power or the PRoT without the PRoT flagging the asset as tainted 435.

An asset can be tainted 435 if an enclosure around the asset is opened without a maintenance ticket. Disconnecting the asset from power or from the PRoT without authorization can cause the asset to be tainted 435. An asset can be tainted if the server rack containing the asset is opened without a maintenance ticket associated with the asset. In addition, assets connected to a PRoT can become tainted 435 if communication between the PRoT and blackbox is interrupted. A tainted 435 asset can be provisioned 420 and can resume running 425 if there was an explanation for why the asset became tainted 435 (e.g., a maintenance ticket was generated for the asset). For example, a tainted asset can be provisioned 420 if a technician accidentally performs maintenance on the wrong asset.

If there is no explanation for why the asset was tainted 435, the asset may be wiped 440. For instance, a PRoT connected to the asset may wipe the asset in response to a command from the blackbox. A PRoT may wipe an asset that is running 425 if the datacenter is being decommissioned, if the asset is going to be replaced, or the asset is broken and a repair is not appropriate. The PRoT can create a record that the asset is wiped, and the record can attest that the asset does not contain any data. For instance the PRoT can send a message attesting to the wipe to the region blackbox. The message can be signed, encrypted, or accompanied by a certificate.

Whether a PRoT wipes an asset can be dictated by a Security Policy. For example, a server with a chassis that has been opened might be tainted. The server may not be trusted and the server may have to be destroyed to mitigate the risk of a physical implant attack (e.g., where hardware components are altered). In another example, under a more relaxed policy, physical reinspection may be sufficient to determine nothing is wrong. Continuing the example, the staff may be able to change the state of the asset from tainted to clean in the blackbox log. The state may only be changed through a cryptographically authenticated mechanism (e.g., the staff can override the state using an override private key that the blackbox can verify with an override public key). In some instances, the override process may require two separate staff working together for stronger assurance.

A wiped asset may be decommissioned 445 by being removed from production and placed in a storage area. The decommissioned asset can be returned to the manufacturer using a return merchandise authorization (RMA) 450. In some circumstances a decommissioned asset can be destroyed using techniques that can ensure that data cannot be recovered from the asset. For example, the asset may be shredded into small pieces so that any data bearing components in the asset are destroyed.

Figure 5:
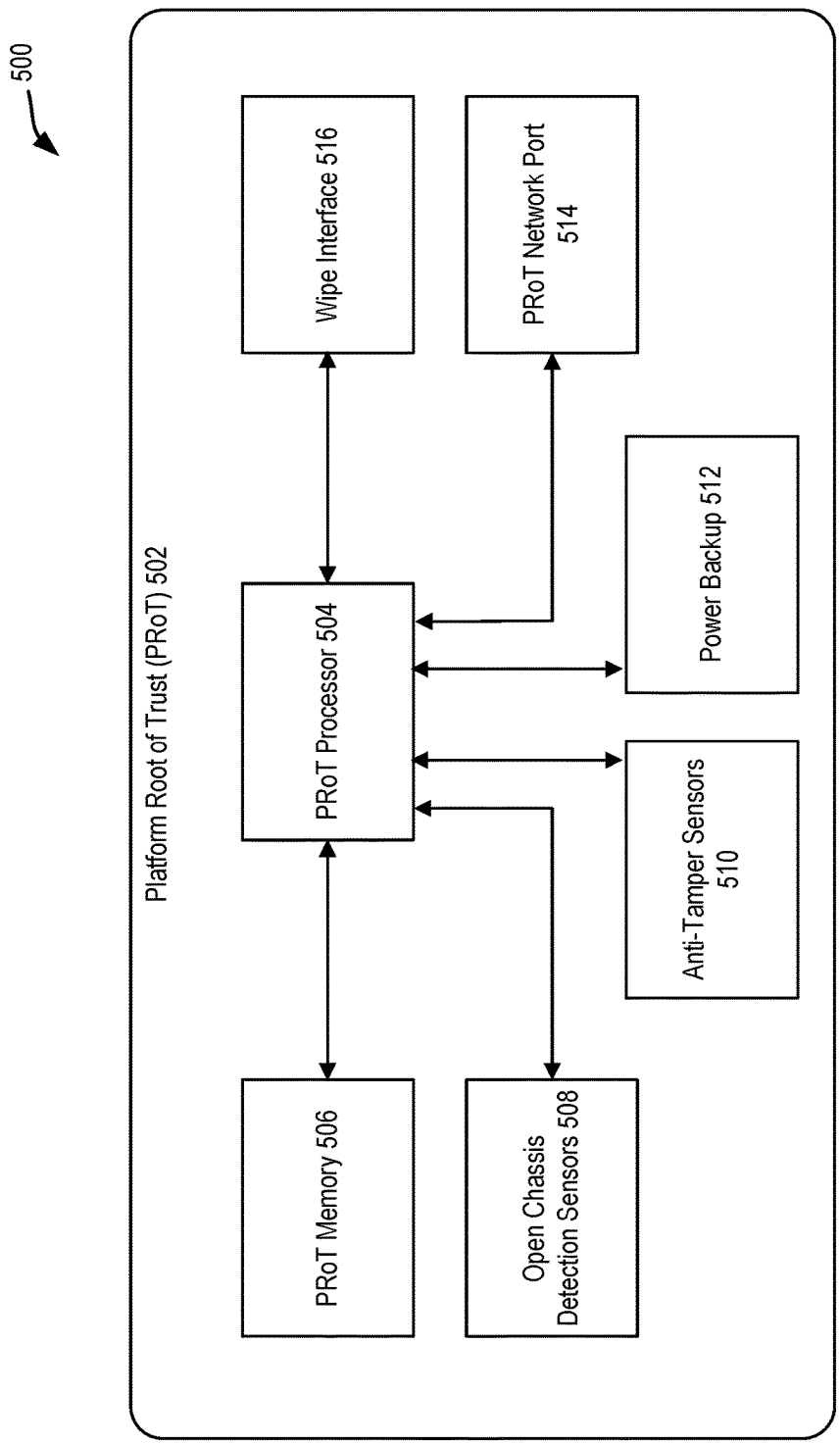
FIG. 5 shows a block diagram of a platform root of trust (PRoT) according to an embodiment.

FIG. 5 shows a block diagram of a platform root of trust (PRoT) according to an embodiment. The PRoT 502 can be located or communicably coupled with a datacenter asset such as a server computer, a network switch, a rack physical security controller, and the like. The PRoT processor 504 can be one or more processors that are connected to the other components in PRoT 502. The PRoT memory 506 can be a non-transitory memory storing instructions that can be executed by the PRoT processor. For example, the PRoT memory 506 can be a solid state drive (SSD), a hard disk drive (HDD), etc.

The PRoT processor 504 can communicate with various sensors such as open chassis detection sensors 508 or anti-tamper sensors 510. Open chassis detection sensors 508, such as light detecting sensors or sensors on the chassis door, can detect whether the chassis is open. For example, the PRoT processor 504 may determine that the chassis is open if the amount of light detected by a light sensor is above a threshold. Anti-tamper sensors 510 can include accelerometers or vibration sensors that can detect if an asset is being touched or modified. For example, a vibration sensor may detect movement from a component in the server being replaced. PRoT processor 504 can receive power from a battery such as power backup 512. PROT processor 504 can use signals from power backup 512 to determine whether the asset has been removed from power which may indicate that the asset has become tainted.

The PRoT processor 504 can send messages with the asset's integrity state to the region blackbox using the PRoT network port 514. The messages can be sent at regular intervals or in response to events (e.g., a message can be sent if the open chassis detection sensors 508 determines that the chassis has been opened). The PRoT processor 504 may send an integrity state message indicating that the asset has been tainted if the processor determines that the chassis has been opened, the asset has been tampered with, or the asset's power has been interrupted. The PRoT processor 504 can determine the integrity state using input from the open chassis detection sensors 508, the anti-tamper sensors 510, or the power backup 512.

The PRoT network port 514 can be a dedicated port that is used to communicate via the PRoT network. Traffic to and from the asset (e.g., server traffic) may not pass through the PRoT network port 514. The PRoT 502 can receive messages from the region blackbox via the PRoT network port 514. For instance, the PRoT 502 may receive a maintenance ticket from the region blackbox via the PRoT network port. The PRoT 502 may receive a message instructing the PRoT processor 504 to wipe the asset. The PRoT processor 504 can use the wipe interface 516 to wipe the asset's memory to remove any sensitive data from the asset. The PRoT processor can send an attestation indicating that the asset has been wiped to the region blackbox via the PRoT network port. The PRoT 502 may be connected to more than one asset in some circumstances.

FIG. 6 is a diagram showing a method 600 for monitoring the status of a datacenter asset according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 600 in greater detail, at block 610, the status of one or more assets can be polled by a computing device. The assets can be assets connected to a PRoT such as PRoT 502. The computing device can be a blackbox such as region blackbox 110. The status for an asset can be polled after authentication using the techniques for communication between a PRoT connected to the asset and a region blackbox disclosed in method 200. The computing-device can send a poll message requesting the asset's status. The poll messages may be transmitted at regular intervals or in response to an event (e.g., a blackbox receives a message that one of the assets is tainted so the blackbox polls all assets in the datacenter). The poll message can be signed with a device private key for the computing device (e.g., a private key for the region blackbox). The messages can be transmitted using a private network, and, for example the private network can be PRoT network 105.

At block 620, one or more replies can be received from the asset. The one or more replies may be signed with an asset private key, for example, a PRoT can sign the message with a PRoT private key. In some circumstance, the asset may transmit the asset's status without the computing device transmitting a poll message. The asset's status can be an integrity state for the asset containing the asset's state, configuration, and firmware version. The replies may be transmitted by a PRoT and the PRoT may transmit the message in response to an event or at regular intervals. The asset private key may be generated and provided to the asset in accordance with method 300.

At block 630, the computing device can validate the one or more replies using the asset public key. The one or more reply, and the polling messages, can contain a nonce where the nonce can be a random number, a pseudo-random number, or a timestamp. A nonce can be a number that is used in cryptographic communication. The nonce can be encrypted using the asset private key to mitigate the risk that the one or more replies have been faked or altered.

At block 640, one or more statuses can be added to a status log. The statuses can be obtained from the validated replies from block 630. The computing device may sign the one or more statuses using the device private key and the statuses may be added to the log with a nonce. In some circumstances, the computing device may transmit the status log to a cloud services provider, or a copy of the log may be provided to one or more assets connected to the computing device. For instance, the blackbox may provide a copy of the status log to one or more PRoTs connected to the PRoT network. The copies of the log can be cross referenced so that modifications to one log can be detected. The status may be added to the log if the reply message was received within a threshold amount of time of the polling message. The status may not be added to the log if too much time has passed between messages which may indicate that the message has been altered.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
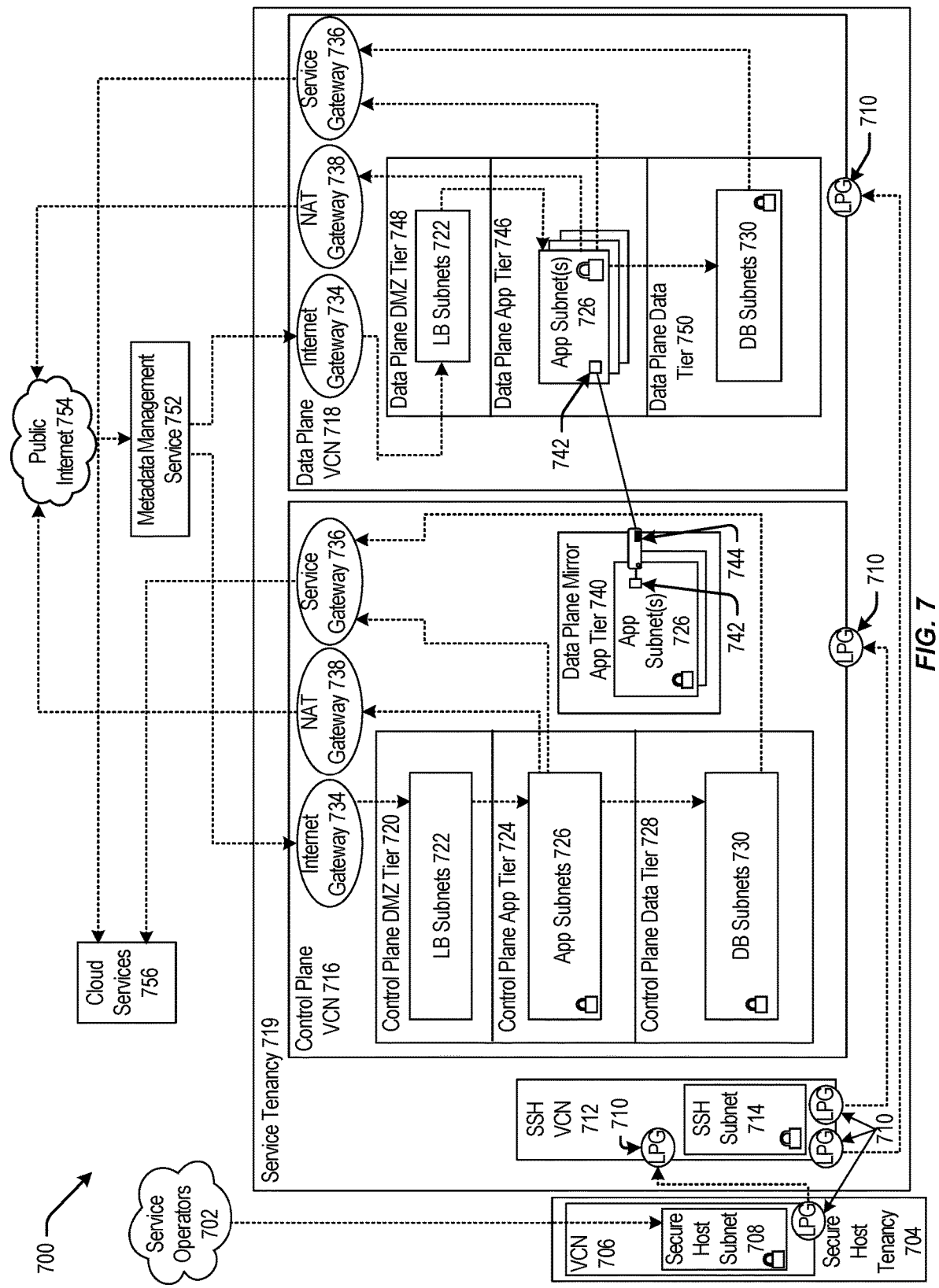
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
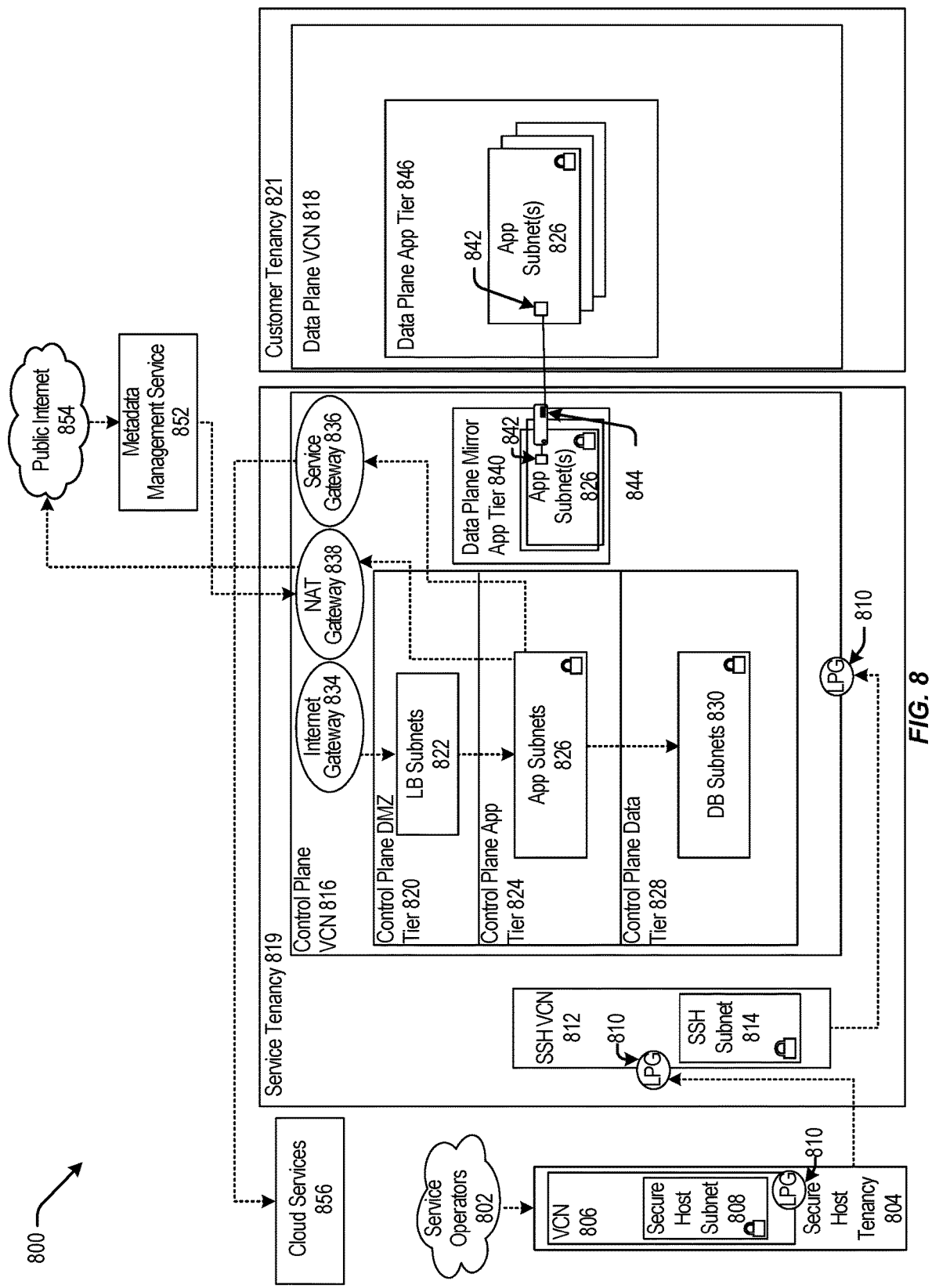
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
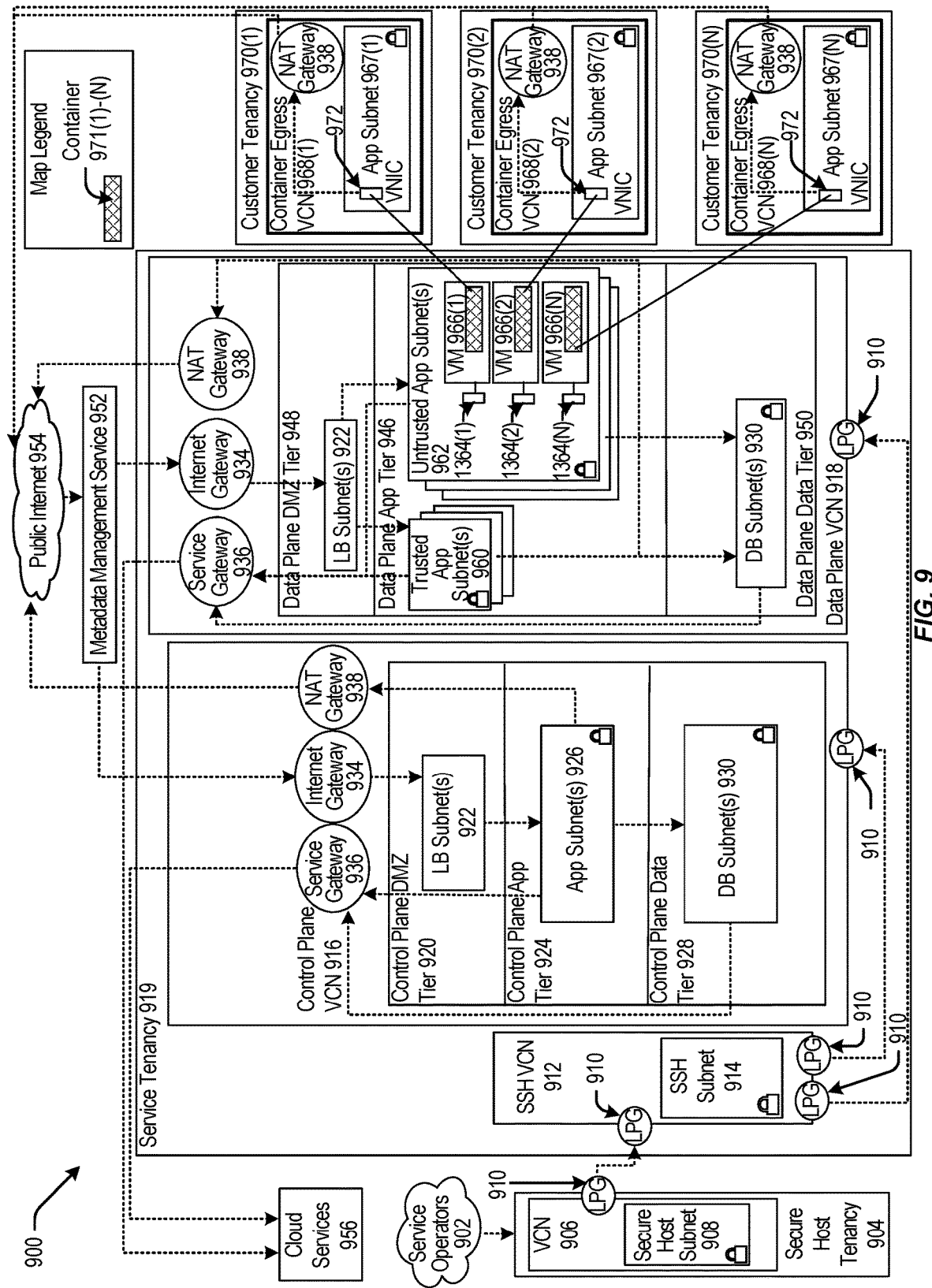
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
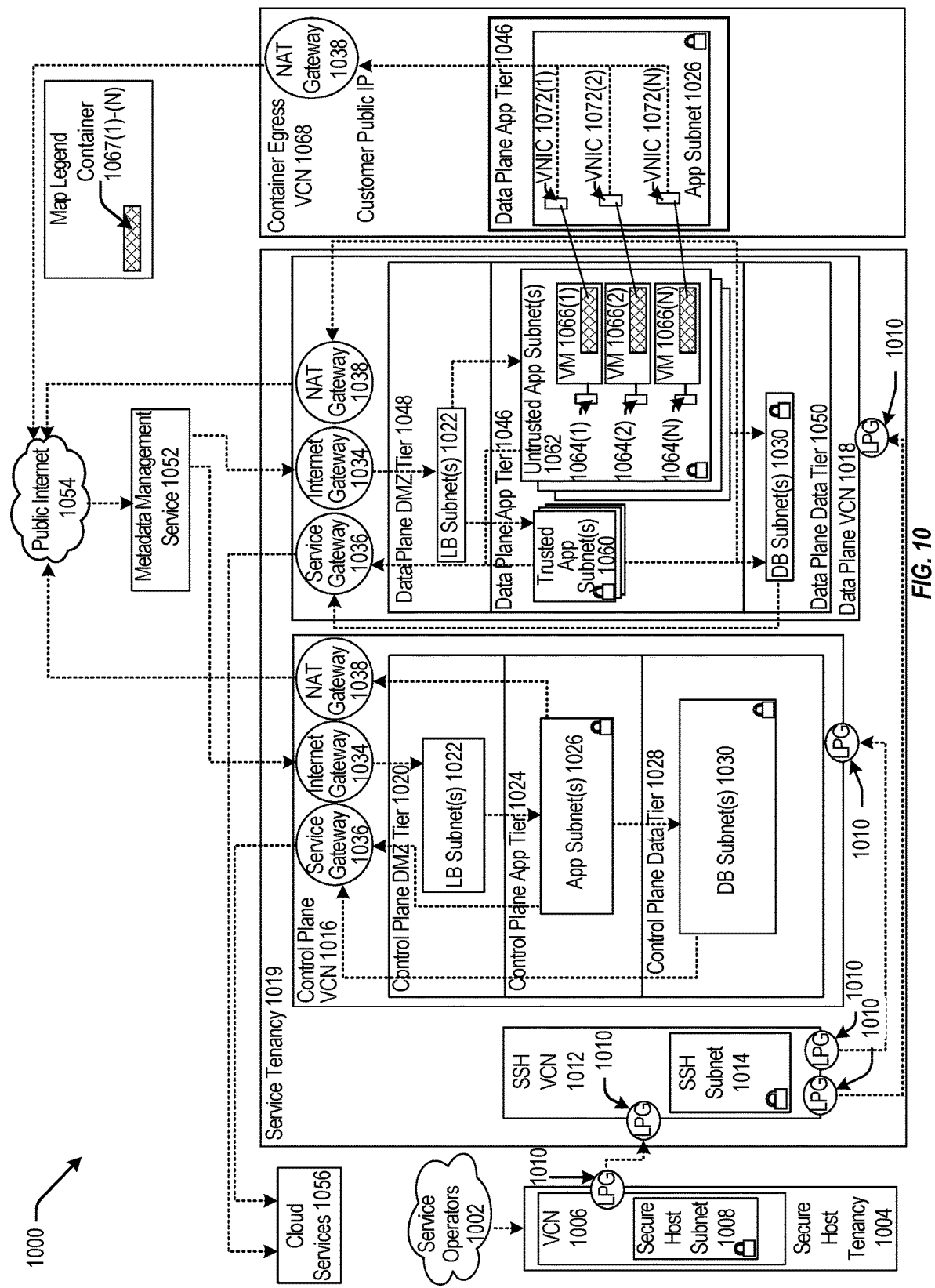
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
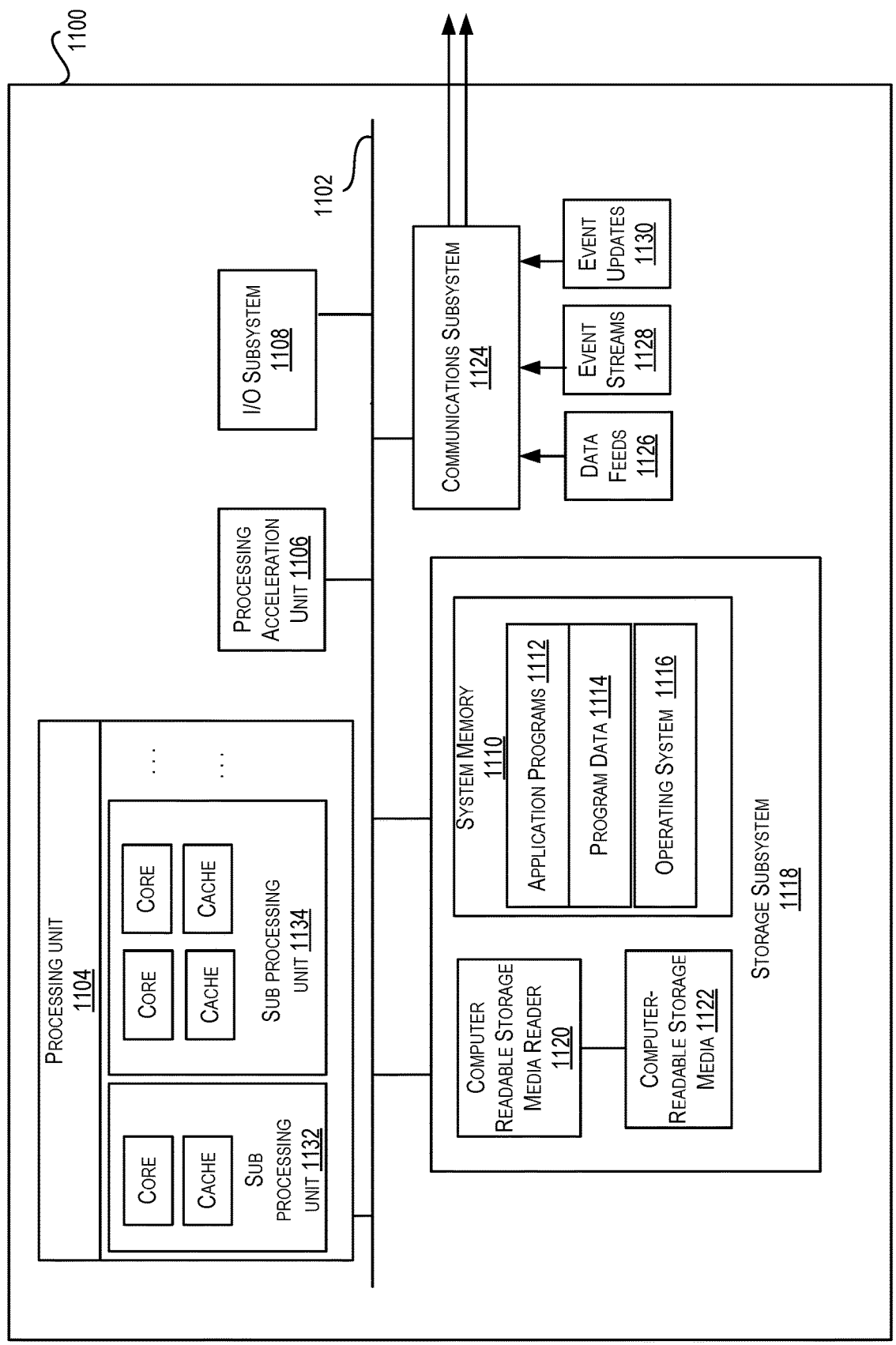
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1118 may also provide a tangible computer-readable storage medium for storing the basic programming and data constructs that provide the functionality of some embodiments. Software (programs, code services, instructions) that when executed by a processor provide the functionality described above may be stored in storage subsystem 1118. These software services or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
polling, by a computing device, statuses of one or more assets with one or more messages signed by a device private key, the one or more assets being polled including a physical security controller for monitoring access to a physical security perimeter, and the one or more assets being located within the physical security perimeter;
receiving, by the computing device, one or more replies from the one or more assets, a reply of the one or more replies being signed with an asset private key and the reply containing a status of an asset;
validating, by the computing device, the one or more replies using one or more asset public keys; and
adding, by the computing device, one or more statuses from the validated replies to a status log.

2. The method of claim 1, wherein the computing device and the one or more assets communicate using a private network.

3. The method of claim 1, wherein a message, of the one or more messages, contains a first nonce and a reply to the message, of the one or more replies, contains a second nonce.

4. The method of claim 3, wherein the first nonce and second nonce comprise at least one of a random number, a pseudo-random number, or a timestamp.

5. The method of claim 1, wherein adding the one or more statuses further comprises:
   signing, by the computing device, the one or more statuses using the device private key.

6. The method of claim 1, wherein the status is added to the status log if the reply is received within a threshold amount of time of the polling.

7. A non-transitory computer-readable medium storing a set of instructions, the set of instructions comprising one or more instructions that, when executed by one or more processors of a computing device, cause the computing device to perform operations comprising:
   polling statuses of one or more assets with one or more messages signed by a device private key, the one or more assets being polled including a physical security controller for monitoring access to a physical security perimeter, and the one or more assets being located within the physical security perimeter;
   receiving one or more replies from the one or more assets, a reply of the one or more replies being signed with an asset private key and the reply containing a status of an asset;
   validating the one or more replies using one or more asset public keys; and
   adding one or more statuses from the validated replies to a status log.

8. The medium of claim 7, wherein the computing device and the one or more assets communicate using a private network.

9. The medium of claim 7, wherein a message, of the one or more messages, contains a first nonce and a reply to the message, of the one or more replies, contains a second nonce.

10. The medium of claim 9, wherein the first nonce and second nonce comprise at least one of a random number, a pseudo-random number, or a timestamp.

11. The medium of claim 7, wherein adding the one or more statuses further comprises:
    signing the one or more statuses using the device private key.

12. The medium of claim 7, wherein the status is added to the status log if the reply is received within a threshold amount of time of the polling.

13. A computing device comprising:
    a storage device;
    a speaker; and
    one or more processors executing configured to execute program instructions stored in the storage device and being configured to at least:
      poll statuses of one or more assets with one or more messages signed by a device private key, the one or more assets being polled including a physical security controller for monitoring access to a physical security perimeter, and the one or more assets being located within the physical security perimeter;
      receive one or more replies from the one or more assets, a reply of the one or more replies being signed with an asset private key and the reply containing a status of an asset;
      validate the one or more replies using one or more asset public keys; and
      add one or more statuses from the validated replies to a status log.

14. The device of claim 13, wherein a message, of the one or more messages, contains a first nonce and a reply to the message, of the one or more replies, contains a second nonce.

15. The device of claim 14, wherein the first nonce and second nonce comprise at least one of a random number, a pseudo-random number, or a timestamp.

16. The device of claim 13, wherein the one or more processors are configured to:
    sign the one or more statuses using the device private key.

17. The device of claim 13, wherein the status is added to the status log if the reply is received within a threshold amount of time of the polling.

* * * * *